United States Patent
Tavassoli Kilani et al.

(10) Patent No.: US 9,094,076 B2
(45) Date of Patent: Jul. 28, 2015

(54) METHOD AND SYSTEM FOR INTERFERENCE CANCELLATION

(71) Applicant: Broadcom Corporation, Irvine, CA (US)

(72) Inventors: Mehdi Tavassoli Kilani, Aliso Viejo, CA (US); Scott Powell, Aliso Viejo, CA (US); Kadir Dinc, Irvine, CA (US); Kishore Kota, Aliso Viejo, CA (US); John Creigh, Rancho Santa Margarita, CA (US); Hooman Parizi, Campbell, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/956,541

(22) Filed: Aug. 1, 2013

(65) Prior Publication Data
US 2013/0315357 A1  Nov. 28, 2013

Related U.S. Application Data

(63) Continuation of application No. 12/857,303, filed on Aug. 16, 2010, now Pat. No. 8,514,951.

(60) Provisional application No. 61/362,012, filed on Jul. 7, 2010, provisional application No. 61/243,987, filed on Sep. 18, 2009.

(51) Int. Cl.
*H04L 1/00* (2006.01)
*H04B 1/10* (2006.01)
(Continued)

(52) U.S. Cl.
CPC .............. *H04B 1/10* (2013.01); *H04L 25/0274* (2013.01); *H04L 25/085* (2013.01); *H04L 25/0292* (2013.01)

(58) Field of Classification Search
CPC ... H04L 25/085; H04L 25/08; H04L 25/0272; H04L 25/0274; H04L 22/0276; H04L 25/0292; H04L 27/01; H04B 15/00; H04B 1/1027; H04B 3/30
See application file for complete search history.

(56) References Cited

U.S. PATENT DOCUMENTS 5,995,567 A * 11/1999 Cioffi et al. .................. 375/346
6,018,754 A    1/2000 Chen et al.
(Continued)

OTHER PUBLICATIONS

Amir Homayoun Kamkar-Parsi, ADSL-VDSL interference mitigation for the fiber to the cabinet architecture using adaptive filtering and the longitudinal signal as a reference, Thesis, University of Ottawa, 2004.*

*Primary Examiner* — Aristocratis Fotakis
(74) *Attorney, Agent, or Firm* — Oblon, McClelland, Maier & Neustadt, L.L.P.

(57) ABSTRACT

Aspects of a method and system for interference cancellation substantially as shown in and/or described in connection with at least one of the figures, as set forth more completely in the claims. In this regard, a receiver may be operable to receive a differential signal via a differential channel, and to sense a common mode signal on the differential channel. A frequency range in which interference is present in the common mode signal may be determined. The differential signal and the common mode signal may be filtered to attenuate frequencies outside the determined frequency range. A phase and/or amplitude of the filtered common mode signal may be adjusted based on the filtered differential signal and the adjusted and filtered common mode signal may be subtracted from the received differential signal. The common mode signal may be sensed via a pair of resistors coupled to the differential channel.

20 Claims, 6 Drawing Sheets

(51) Int. Cl.
*H04L 25/08* (2006.01)
*H04L 25/02* (2006.01)

(56) References Cited

U.S. PATENT DOCUMENTS

| | | | |
|---|---|---|---|
| 6,052,420 A * | 4/2000 | Yeap et al. | 375/346 |
| 6,546,057 B1 | 4/2003 | Yeap | |
| 6,714,588 B1 | 3/2004 | Thomas et al. | |
| 6,940,973 B1 | 9/2005 | Yeap et al. | |
| 6,959,056 B2 | 10/2005 | Yeap | |
| 6,976,044 B1 | 12/2005 | Kilani | |
| 7,315,592 B2 | 1/2008 | Tsatsanis | |
| 7,593,494 B1 * | 9/2009 | Ghobrial et al. | 375/350 |
| 7,809,076 B1 * | 10/2010 | Ghobrial et al. | 375/285 |
| 2001/0050987 A1 * | 12/2001 | Yeap et al. | 379/399.01 |
| 2002/0093908 A1 * | 7/2002 | Yeap | 370/201 |
| 2004/0042572 A1 | 3/2004 | Palaskas et al. | |
| 2008/0100372 A1 | 5/2008 | Lin | |
| 2008/0144709 A1 | 6/2008 | McCallister et al. | |
| 2010/0111202 A1 * | 5/2010 | Schley-May et al. | 375/258 |
| 2012/0002711 A1 * | 1/2012 | Kota et al. | 375/232 |
| 2012/0051410 A1 * | 3/2012 | Flowers et al. | 375/222 |

* cited by examiner

METHOD AND SYSTEM FOR INTERFERENCE CANCELLATION

This patent application is a continuation of U.S. patent application Ser. No. 12/857,303, titled "Method and System for Interference Cancellation," filed Aug. 16, 2010, and makes reference to, claims priority to and claims benefit from U.S. Provisional Patent Application Ser. No. 61/243,987, filed Sep. 18, 2009, and U.S. Provisional Patent Application Ser. No. 61/362,012, filed Jul. 7, 2010.

Each of the above stated applications are hereby incorporated herein by reference in their entirety.

FIELD OF THE INVENTION

Certain embodiments of the invention relate to signal processing. More specifically, certain embodiments of the invention relate to a method and system for interference cancellation.

BACKGROUND OF THE INVENTION

In almost any communication system, interference, externally and/or internally generated, limits the performance of the communication system. Differential signaling is one technique that can be utilized for dealing with such interference. However, while differential signaling may reduce the effects of such interference, it does not eliminate them.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for interference cancellation, substantially as illustrated by and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for interference cancellation. In various embodiments of the invention, a receiver may be operable to receive a differential signal via a differential channel, and to sense a common mode signal on the differential channel. A frequency range in which interference is present in the common mode signal may be determined and the common mode signal and the differential signal may be filtered to attenuate frequencies outside the determined frequency range. A phase and/or amplitude of the filtered common mode signal may be adjusted based on the filtered differential signal and the adjusted and filtered common mode signal may be subtracted from the received differential signal. The common mode signal may be sensed via a pair of resistors coupled to the differential channel. A first terminal of a first one of the resistors may be coupled to a first wire of the differential channel, a first terminal of a second one of the resistors may be coupled to a second wire of the differential channel, a second terminal of the first one of the resistors may be coupled to a second terminal of the second one of the resistors, and the common mode signal may be present on the second terminals of the resistors. The second terminals of the resistors may be coupled to a first terminal of a primary winding of a transformer and a second terminal of the primary winding may be coupled to signal ground.

Either of an adaptive line enhancer and a filter may be selected for performing the filtering. A selection between the adaptive line enhancer and the filter may be based on signal levels output by the adaptive line enhancer and the filter. The filter may be selected in instances that the adaptive line enhancer is unable to converge on a frequency within the determined frequency range. A frequency response of the filter may be configured to select between a high-pass response and a low-pass response. The frequency range may be determined based on a pre-programmed or dynamically programmed value. The subtraction may be enabled and disabled based on signal levels of the common mode signal and/or signal levels of the filtered common mode signal. A phase and/or amplitude of the filtered common mode signal may be adjusted to minimize a difference between the filtered differential signal and the adjusted and filtered common mode signal.

Figure 1:
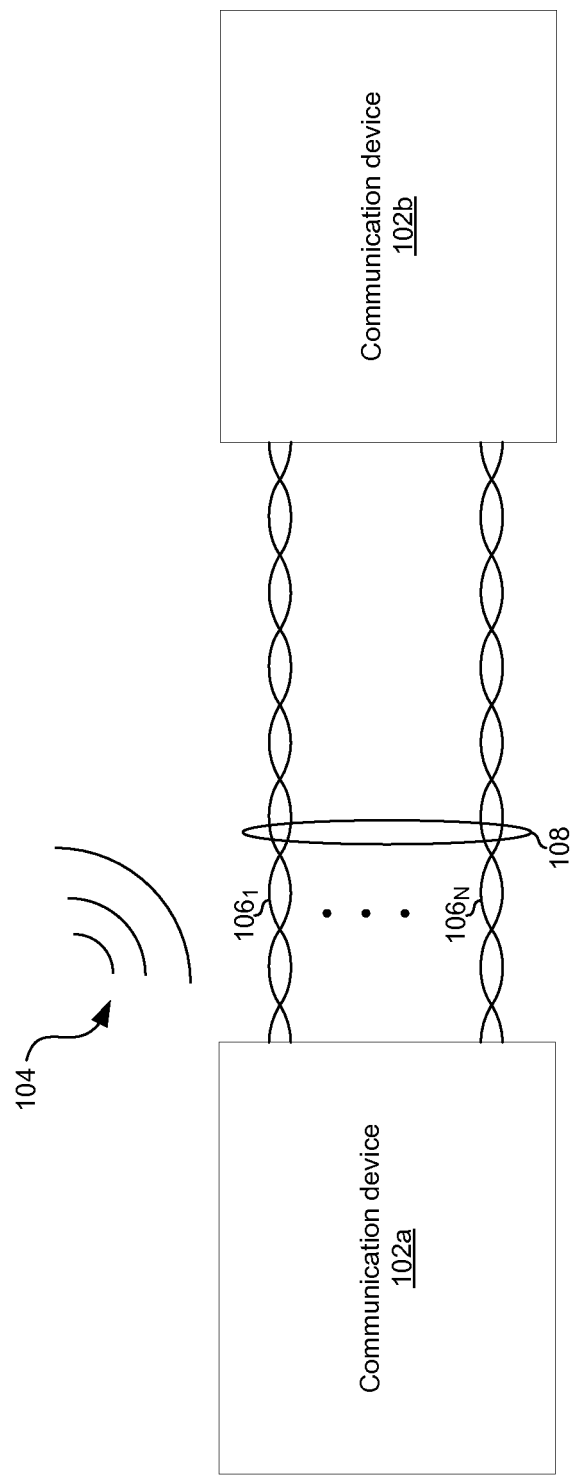
FIG. 1. is a diagram depicting two communication devices communicating over a plurality of communication channels, in accordance with an embodiment of the invention.

FIG. 1 is a diagram depicting two communication devices communicating over a plurality of communication channels, in accordance with an embodiment of the invention. Referring to FIG. 1 there is shown a communication device $102a$ and a communication device $102b$ which communicate over a cable 108 that comprises communication channels $106_1$-$106_N$, where N is an integer greater than or equal to 1.

Each of the communication devices $102a$ and $102b$ may comprise suitable logic, circuitry, interfaces, and/or code that may be operable to communicate, utilizing differential signaling, over one or more of the channels $106_1$-$106_N$. Each communication channel $106_n$ may comprise, for example a twisted-pair, where n is an integer between 1 and N inclusive. In this regard, each of the communication devices $102a$ and $102b$ may comprise one or both of a transmitter and a receiver. In various embodiments of the invention, the communication devices $102a$ and $102b$ may communicate over the cable 108 in accordance with IEEE 802.3 (Ethernet) standards. For example, for 10/100/1G/10 GBASE-T the cable 108 may comprise twisted pairs $106_1$-$106_4$, and the communication devices 102a and 102b may, depending on the particular 802.3 standard being utilized, may engage in simplex, half-duplex, and/or full-duplex communications over one or more of the twisted pairs $106_1$-$106_4$.

In operation, interference signal 104 having frequency $f_{int}$ may be incident on the cable 108 and may appear on the channels $106_1$-$106_N$ as a common mode signal. Exemplary sources of the interference 104 comprise broadcast radio and/or television signals, cellular signals, and radiated electromagnetic interference (EMI) from other electronic devices or cables located near the cable 108. Degraded communications over the cable 108 resulting from the interference 104 may manifest itself in the form of, for example, increased receive error rates in the communication devices 102a and 102b. Accordingly, various aspects of the invention may enable, for each channel $106_n$, accurate estimation and/or reproduction of a common mode interference on the channel $106_n$, and subtracting the common mode interference from the differential signal received via the channel $106_n$. In an exemplary embodiment of the invention, the N common mode interference signals may be estimated or reproduced by detecting the common mode signal on only one of the channels $106_1$-$106_N$. Accordingly, redundant detection circuitry may be reduced or eliminated. The common mode signals may be detected on any number of channels and utilized for reducing interference on any number of channels.

Figure 2:
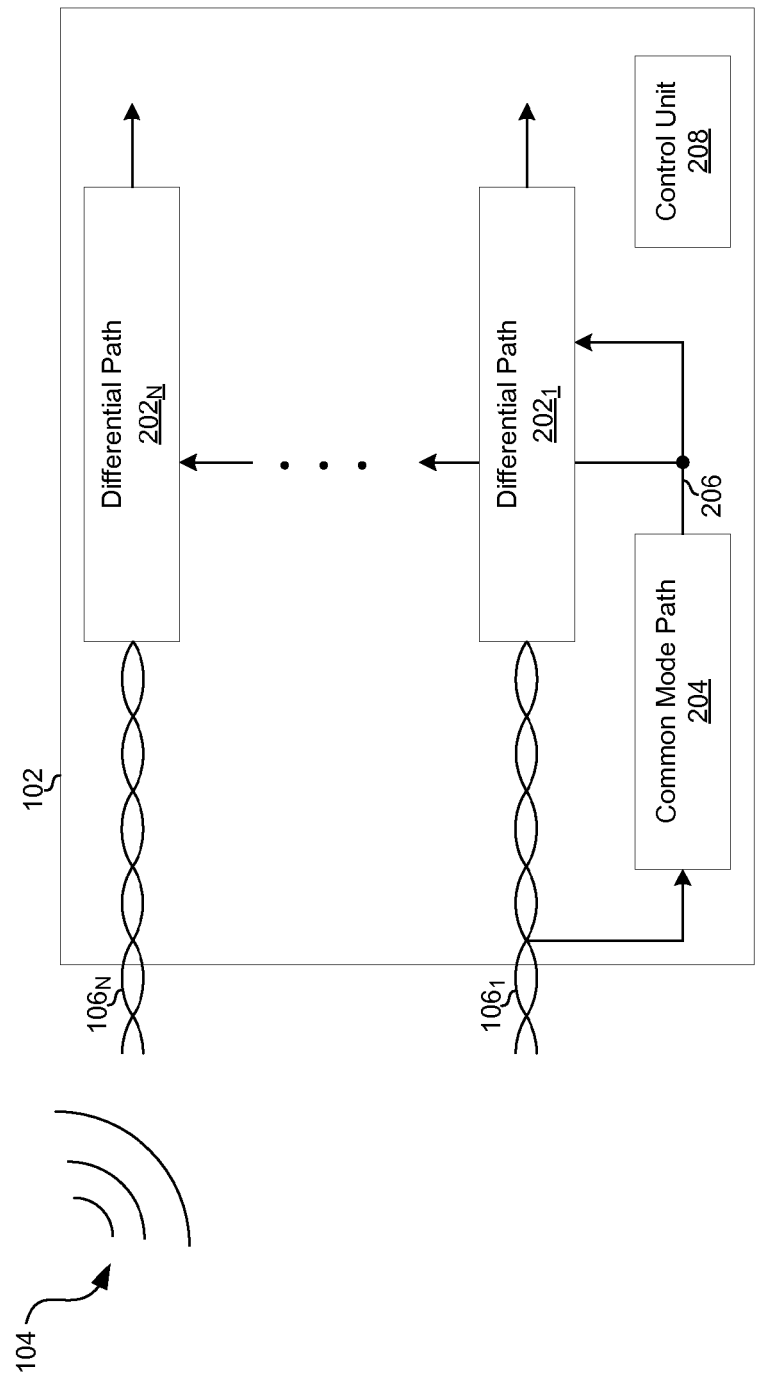
FIG. 2 is a diagram depicting an exemplary portion a communication device, which may be operable to provide interference cancellation, in accordance with an embodiment of the invention.

FIG. 2 is a diagram depicting an exemplary portion of a communication device, which may be operable to provide interference cancellation, in accordance with an embodiment of the invention. Referring to FIG. 2 the communication device 102 may comprise differential processing paths $202_1$-$202_N$, common mode processing path 204, and control unit 208.

The common mode path 204 may comprise suitable logic, circuitry, interfaces, and/or code that may be operable to sense a raw common mode signal present on the channel $106_1$, and to process the raw signal to output an enhanced common mode signal 206. The common mode path 204 may be operable to generate the common mode signal 206 by amplifying, filtering, and/or delaying the raw signal. The common mode signal 206 may be output to each of the differential paths $202_1$-$202_N$.

Each differential path $202_n$ may comprise suitable logic, circuitry, interfaces, and/or code that may be operable to adjust the phase and/or amplitude of the enhanced common mode signal 206 and subtract the resulting signal from the differential signal received via the channel $106_n$.

The control unit 208 may comprise suitable logic, circuitry, interfaces, and/or code that may be operable to configure the differential paths $202_1$-$202_N$ and/or the common mode path 204. For example, the control unit 208 may provide control signals to switching elements such as multiplexers, control gain of one or more amplifiers, control frequency of one or more filters, and/or control a delay introduced by one or more delay elements or components. In an exemplary embodiment of the invention, the control unit 208 may configure the differential paths $202_1$-$202_N$ and/or the common mode path 204 based on a signal strength of the raw common mode signal, the common mode signal 206, or some intermediate signal achieved while generating the common mode signal 206 from the raw common mode signal.

In operation, the signal 104 incident on the channels $106_1$-$106_N$ may result in a narrowband common mode interference signal at $f_{int}$ on each of the channels $106_1$-$106_N$. Furthermore, due to length and/or impedance mismatches, for example, some of that common mode interference may get converted to narrowband interference at $f_{int}$ in the differential signal. To cancel or reduce such interference, the common mode interference on each channels $106_n$ may be replicated or estimated and may be subtracted from the differential signal received via the channel $106_n$.

Figure 3:
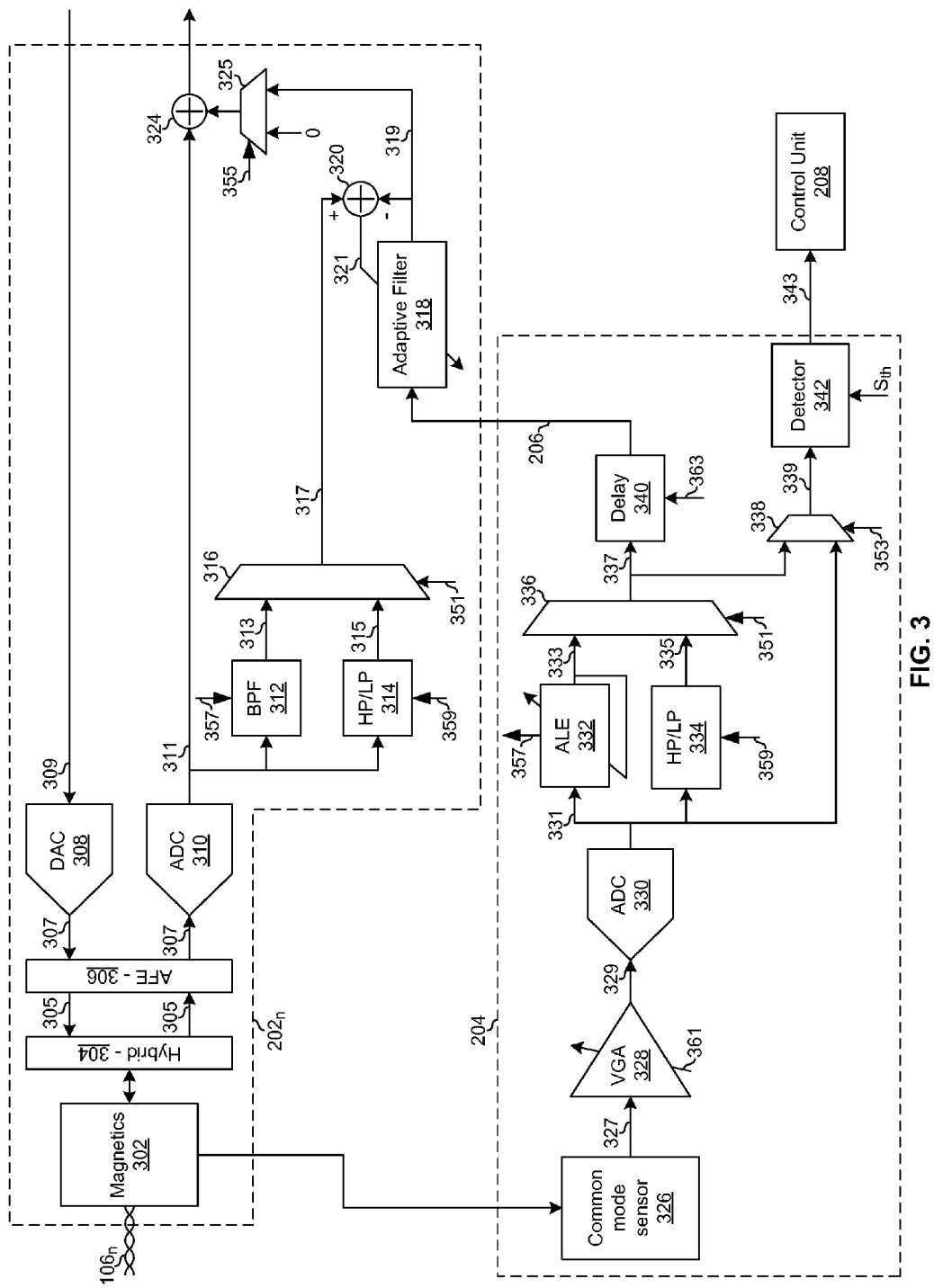
FIG. 3 is another diagram depicting an exemplary portion a communication device, which may be operable to provide interference cancellation, in accordance with an embodiment of the invention.

FIG. 3 is another diagram depicting an exemplary portion a communication device, which may be operable to provide interference cancellation, in accordance with an embodiment of the invention. Referring to FIG. 3 there is shown an exemplary differential path $202_n$, the common mode path 204, and the control unit 208. The differential path $202_n$ comprises magnetics 302, hybrid 304, analog front end 306 (AFE), digital-to-analog converter (DAC) 308, analog-to-digital converter (ADC) 310, bandpass filter (BPF) 312, filter bank 314, multiplexers 316 and 325, adaptive filter 318, and combiners 320 and 324. Although FIG. 3 depicts only a single differential path, each of the differential paths $202_1$-$202_N$ may be treated and/or behave in a manner that is similar to that of the exemplary differential path $202_n$. The common mode path 204 comprises common mode sensor 326, variable gain amplifier (VGA) 328, ADC 330, adaptive line enhancer (ALE) 332, filter bank 334, multiplexers 336 and 338, delay block 340, and detector 342.

The magnetics 302 may comprise suitable logic, circuitry, interfaces, and/or code that may be operable to couple the channel $106_n$ to the differential path $202_n$. In this regard, the magnetics 302 may provide noise and/or EMI suppression and/or may impedance match the channel $106_n$ to the differential path $202_n$. In this regard, the magnetics 302 may comprise one or more transformers and/or one or more inductive chokes. In some instances, the magnetics 302 may also comprise other components such as resistors, capacitors, and/or inductors for achieving impedance matching, isolation, and/or noise and/or EMI suppression. In some embodiments of the invention, the magnetics 302 may comprise the common mode sensor 326, as described below with respect to FIG. 4. In various embodiments of the invention, the various components depicted in FIG. 3 may be interconnected via differential traces on and/or in printed circuit boards (PCBs) and/or integrated circuits (ICs) on and/or in which the components are fabricated. Such differential signal routing may reduce noise coupled into the signals within and/or on the PCBs and/or ICs.

The hybrid 304 may comprise suitable logic, circuitry, and/or code that may enable separation of the transmitted and received signals from the channel $106_n$ and combining transmitted and received signals onto the channel $106_n$.

The analog front end (AFE) 306 may comprise suitable logic, circuitry, interfaces, and/or code that may be operable to perform processing of received signals and signals that are to be transmitted in the analog domain. Such processing may comprise, for example, amplification, filtering, modulation, and demodulation.

The DAC 308 may comprise suitable logic, circuitry, interface, and/or code that may be operable to convert a digital signal to an analog representation. That is, the digital signal 309 is converted to the analog signal 307.

Each of the ADCs 310 and 330 may comprise suitable logic, circuitry, interface, and/or code that may be operable to convert an analog signal to a digital representation. That is, the analog signal 307 is converted to the digital signal 311.

The BPF 312 may comprise suitable logic, circuitry, interfaces, and/or code having a frequency response such that frequencies within a selected band, the passband, are attenuated less than frequencies above and below the selected band. The frequency response of the BPF 312 may be controlled via the control signal 357 which may be generated by the ALE 332 and/or the control unit 208.

Each of the filter banks 314 and 334 may comprise suitable logic, circuitry, interfaces, and/or code that may be configurable to have a high-pass and/or low-pass frequency response. The frequency response of each of the filter banks 314 and 334 may be controlled via the control signal 359 from the control unit 208. In an exemplary embodiment of the invention each of the filter banks may comprise a first order infinite impulse response (IIR) filter.

Each of the multiplexers 316, 325, 336, and 338 may comprise suitable logic, circuitry, interfaces, and/or code that may be operable to select one of a plurality of inputs for conveyance to an output. The signals 351, 351, 355, and 353 generated by the control unit may control, respectively, the multiplexers 316, 336, 325 and 338.

The adaptive filter 318 may comprise suitable logic, circuitry, interfaces, and/or code that may be operable to adjust an amplitude and/or phase of the signal 206 to minimize the error signal 321. In an exemplary embodiment of the invention, the adaptive filter 318 may comprise a two tap finite impulse response (FIR) filter. In various embodiments of the invention, a bandwidth and/or step size utilized in an adaptation algorithm performed by the adaptive filter 318 may be configured by the control unit 208. Such control may affect how long it takes the adaptive filter 318 to converge and/or the accuracy of the coefficients on which it converges.

The combiners 320 and 324 may each comprise suitable logic, circuitry, interfaces, and/or code that may be operable to combine digital signals. The combiners 320 and 324 may be operable to add and/or subtract two or more digital signals. The combiners 320 and 324 may be operable to weight the signals prior to addition or subtraction.

The common mode sensor 326 may comprise suitable logic, circuitry, interfaces, and/or code operable to detect a common mode signal on the channel $106_n$. The common mode sensor 326 may output a raw common mode signal 327. In an exemplary embodiment of the invention, the common mode sensor may comprise a pair of resistors and a transformer as described below with respect to FIG. 4. In another exemplary embodiment of the invention, the common mode sensor 326 may comprise a center tap of a transformer in the magnetics 302.

The variable gain amplifier (VGA) 328 may comprise suitable logic, circuitry, interfaces, and/or code that may be operable to amplify the raw common mode signal 327. The gain of the VGA 328 may be controlled via control signal 361 from the control unit.

The ALE 332 may comprise suitable logic, circuitry, interfaces, and/or code that may be operable to suppress wideband noise component of the signal 331 while passing a narrow band component of the signal 331. In this regard, the ALE 332 may implement one or ore more algorithms to automatically seek and attempt to lock its passband to the frequency, $f_{int}$, of the narrowband interference resulting from the interference signal 104 (FIG. 1). In an exemplary embodiment of the invention, the ALE 332 may comprise a second order Infinite Impulse Response (IIR) bandpass filter. In an exemplary embodiment of the invention, the ALE 332 may comprise a finite impulse response (FIR) filter. In various embodiments of the invention, a bandwidth and/or step size utilized in an adaptation algorithm performed by the ALE 332 may be configured by the control unit 208. Such control may affect how long it takes the ALE 332 to converge and/or the accuracy of the frequency on which it converges.

The delay block 340 may comprise suitable logic, circuitry, interfaces, and/or code that may be operable to delay the signal 337. That is, the signal 206 may be a delayed version of the signal 337. The delay introduced by the delay block 340 may be controlled by a control signal 363 from the control unit. The delay block 340 may compensate for the difference in delays between the differential path $202_n$ and common mode path 204. The delay introduced by the delay block 340 may be fixed or programmable.

The detector 342 may comprise suitable logic, circuitry, interfaces, and/or code that may be operable to detect the levels of the signal 339 and compare the levels of the signal 339 to a threshold, $S_{th}$. The output 343 of the detector 342 may indicate whether the levels of the signal 342 is greater than or less than $S_{th}$.

The control unit 208 may be as described with respect to FIG. 2. The control unit 208 may be operable to generate the control signal 351 for controlling the multiplexers 316 and 336, the control signal 353 for controlling the multiplexer 338, the control signal 355 for controlling the multiplexer 325, the control signal 359 for configuring the filter banks 314 and 334, the control signal 361 for controlling the VGA 361, the control signal 363 for controlling the delay 363, and the threshold voltage $S_{th}$. In an exemplary embodiment of the invention, the control unit 208 may comprise a processor and memory.

In operation, the raw common mode signal 327 may be obtained from the sensor 326. The raw common mode signal 327 may be scaled by the VGA 328 resulting in the signal 329. Such scaling may be utilized to accommodate for the dynamic range of the ADC 330. The signal 329 may be digitized by the ADC 330 to generate the signal 331 which is input to ALE 332 and the filter bank 334.

The ALE 332 may attempt to detect and converge on the frequency, $f_{int}$, of the narrowband interference present in the signal 331. After convergence, the bandpass filter portion of the ALE 332 may filter out wideband noise while passing a narrow range of frequencies around $f_{int}$. In instances that the ALE 332 converges on $f_{int}$, then the multiplexer 336 may select the signal 333 to be output as the signal 337.

In instances that the $f_{int}$ is outside a range suitable for the bandpass filtering of the ALE 332, the output. That is, when the ALE 332 cannot converge on $f_{int}$, the output the multiplexer 336 may select the output 335 of the filter bank 334 to be output as the signal 337. In this regard, in instances that $f_{int}$ is lower than the convergence range of the ALE 332, the filter bank 334 may be configured into a low-pass configuration. Similarly, in instances that $f_{int}$ is higher than the convergence range of the ALE 332, the filter bank 334 may be configured into a high-pass configuration.

The signal 337 may be communicatively coupled to the delay block 340. The amount of delay introduced by the delay block 340 may be controlled such that that the enhanced common mode signal 206 is roughly time aligned with the signal 317 in the differential path $202_n$.

The signal 337 is also coupled to the multiplexor 338. The multiplexor 338 may select between the signals 331 and the signals 337 for conveyance to the detector 342. In this regard, when the signal 331 is selected, the threshold $S_{th}$ may be set to a first value and when the signal 337 is selected, the threshold $S_{th}$ may be set to a second value. The detector 342 may measure levels of the signal 337 within a time period and compare the levels against the threshold $S_{th}$. The result 343 of the comparison may be input to the control unit 208 which may generate on or more control signals based on the result. In an exemplary embodiment of the invention, the multiplexer 338 and the detector 342 may be utilized to determine when to enable and when to disable interference cancellation. An example of enabling and disabling interference cancellation is described below with respect to FIG. 6.

In an exemplary embodiment of the invention, to select among the ALE 332 and the filter bank 334, the control unit 208 may alternate signal 351 between 0 and 1, thus alternating selection of the signal 333 and the signal 335, and determine which of the signals 333 and 335 to select based on the levels of the signals. For example, if the ALE 332 achieves convergence while it is selected, then the control unit 208 may stop alternating the signal 353 and stay on the value of the signal 353 that selects signal 333. If the ALE 332 does not converge, the signal 335 may be selected and signal levels may be checked for each of a high-pass and low-pass configuration of the filter bank 334. If either the high-pass or low-pass configuration results in signal 339 being above the threshold, then signal 335 may be selected and the signal 353 may stop alternating. Otherwise, the signal 333 may again be selected as the ALE 332 again attempts to converge on the narrowband interference, utilizing, for example, new parameters for bandwidth and/or adaptation step size. The process may repeat until the narrowband interference at $f_{int}$ is detected. In an exemplary embodiment of the invention, a low-pass configuration of the filter bank 334 may be selected when $f_{int}$ is on the low end of the frequency spectrum, a high-pass configuration of the filter bank 334 may be selected when $f_{int}$ is equal to half the sampling frequency or higher, and the ALE 332 may be selected for when $f_{int}$ is somewhere in between.

The signal 351 also controls the multiplexer 316. Accordingly, if the signal 333 is selected by the multiplexer 336, then the signal 313 is selected by the multiplexer 316. In instances that the ALE 332 has converged on $f_{int}$, and the signal 333 has been selected by the multiplexer 336, the configuration of the ALE 332 may be copied to the BPF 312. That is, the signal 357 may configure the BPF 312 to have the same (within a tolerance) frequency response as the ALE 332. Similarly, in instances that the signal 335 is selected, the configuration of the filter bank 334 may be copied to the filter bank 314. That is, the signal 359 may configure the filter bank 314 to have the same, within a tolerance, frequency response as the filter bank 334.

The signals 317 and 206 may be input to the adaptive filter 318. The adaptive filter 318 may adjust the amplitude and/or phase of the signal 206 to generate the signal 319. In this regard, the adaptive filter 318 may adjust the phase and/or amplitude of the signal 206 to minimize the error signal 321. The signal 319 may correspond to an accurate replica of the interference in the signal 311 resulting from the interfering signal 104 (FIG. 1). Accordingly, once signal 319 is a stable representation of the narrowband interference at $f_{int}$ in the signal 311, the multiplexer 325 may be configured to output the signal 319 to the combiner 324 such that the signal 319 is subtracted from the signal 311. In this regard, when interference cancellation is disabled and/or the system is unable to detect or lock to the narrowband interference at $f_{int}$, the multiplexer 325 may select the zero input which allows the signal 311 to pass through the combiner 324 unmodified.

Figure 4:
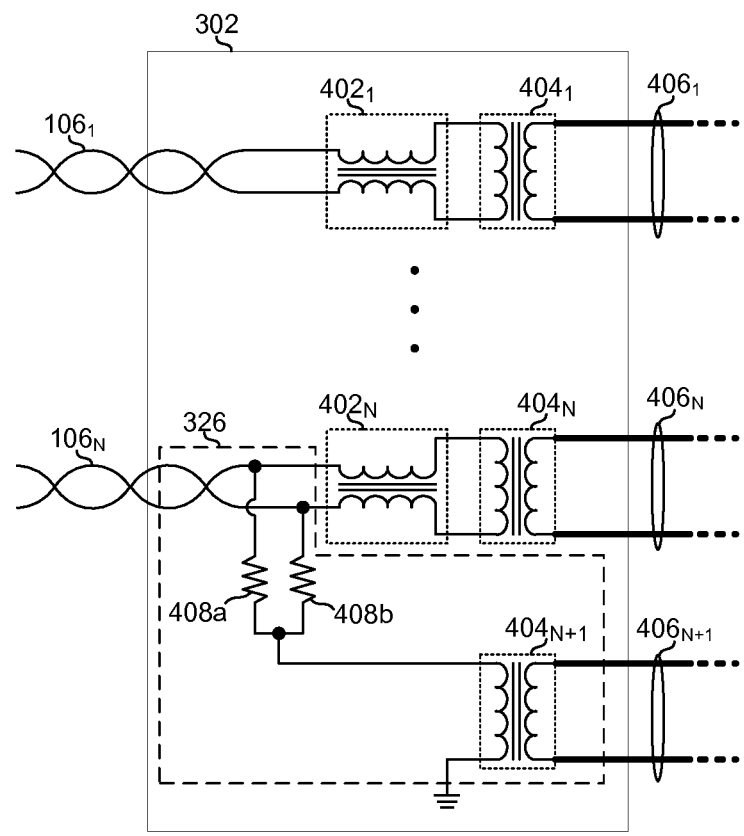
FIG. 4 is a diagram illustrating exemplary magnetics which may be operable to provide interference cancellation for a communication device, in accordance with an embodiment of the invention.

FIG. 4 is a diagram illustrating exemplary magnetics, which may be operable to provide interference cancellation, for a communication device, in accordance with an embodiment of the invention. Referring to FIG. 4, the magnetics 302 may couple the channels $106_1$-$106_N$ to the differential signal traces $406_1$-$406_N$. The magnetics 302 and may comprise chokes $402_1$-$402_N$, transformers $404_1$-$404_{N+1}$, and resistors 408a and 408b. In this regard, the common mode sensor 326 described with respect to FIG. 3 may comprise the resistors 408a and 408b and the transformer $404_{N+1}$.

The chokes $402_1$-$402_N$ may be operable to attenuate common mode signals while passing differential signals. In an exemplary embodiment of the invention, the chokes $402_1$-$402_N$ may comprise one or more inductors and/or ferrites.

The transformers $404_1$-$404_N$ may be operable to inductively couple the differential outputs of the chokes $402_1$-$402_N$ to the differential signal traces $406_1$-$406_N$. Each of the transformers $404_1$-$404_N$ may comprise a primary winding, a secondary winding, and a core.

Figure 5:
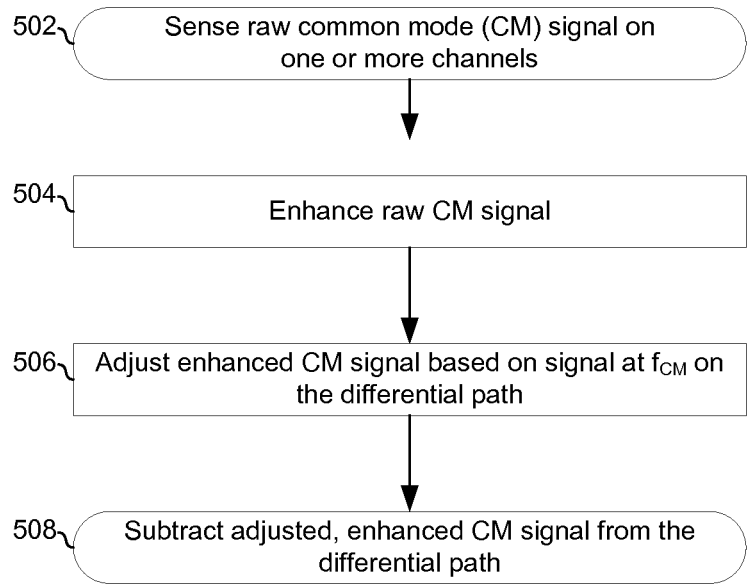
FIG. 5 is a flow chart illustrating exemplary steps for interference cancellation, in accordance with an embodiment of the invention.

In operation, common mode energy on the two conductors of channel $106_N$ may sum through the resistors 408a and 408b and appear as a single-ended raw common mode signal at the primary winding $404_{N+1}$. The transformer $404_{N+1}$ may convert the single-ended raw common mode signal to a differential raw common mode signal on the differential trace $406_{N+1}$ FIG. 5 is a flow chart illustrating exemplary steps for interference cancellation, in accordance with an embodiment of the invention. Referring to FIG. 5, the exemplary steps may begin with step 502 when a common mode sensor may sense a common mode signal on a differential channel and output a raw common mode signal. In step 504, the raw common mode signal may be enhanced by amplifying it, filtering it, and/or delaying it. The filtering may comprising automatically centering a pass band around a frequency, $f_{int}$, of a narrowband interference signal present in the raw common mode signal, such that the narrow band interference signal is passed while wideband noise is filtered out.

In step 506, a phase and/or amplitude of the enhanced common mode signal may be adjusted such that the phase and amplitude of the enhanced common mode signal are approximately equal to the phase and amplitude of interference present on a received differential signal. That is, the same source of interference that generated the narrowband interference present in the common mode signal may also have created some interference on a received differential signal. That is, through imperfections in the channel and/or the received differential signal, some common mode to differential conversion may take place that results in interference in the received differential signal. Accordingly, adjusting the phase and/or amplitude of the enhanced common mode signal may result in a signal that accurately estimates the interference in the differential signal. In step 508, the interference estimate, that is, the phase and/or amplitude adjusted version of the enhanced common mode signal, may be subtracted from the received differential signal, thus resulting in a cleaner received signal.

Figure 6:
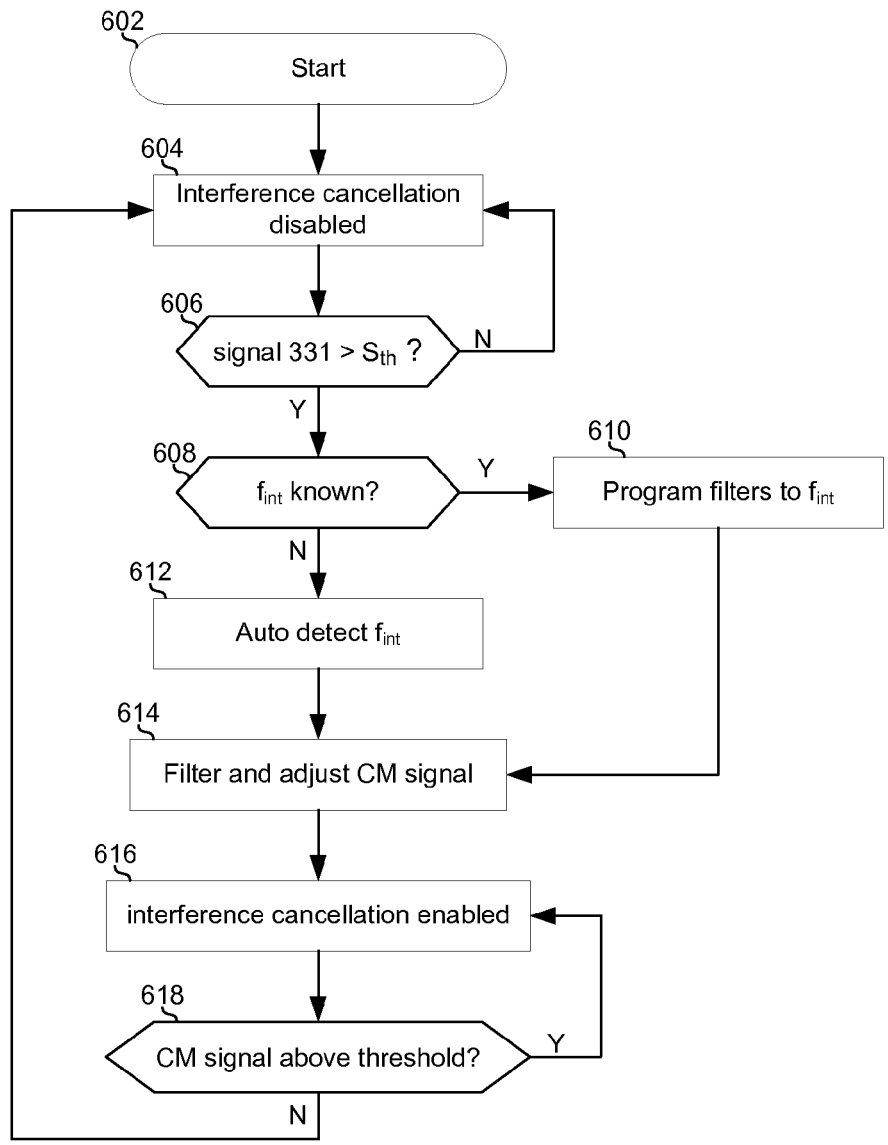
FIG. 6 is another flow chart illustrating exemplary steps for interference cancellation, in accordance with an embodiment of the invention.

FIG. 6 is another flow chart illustrating exemplary steps for interference cancellation, in accordance with an embodiment of the invention. Referring to FIG. 6, the exemplary steps may begin with start step 602 and proceed to step 604. In step 604, the communication device 102a may begin receiving signals via one or more of the differential channels $106_1$-$106_N$. The communication device 102a may initially be configured such that interference cancellation is disabled.

In step 606, it may be determined whether signal 331 is greater than a first value of the threshold $S_{th}$. In this regard, while interference cancellation is disabled, the multiplexer 338 may be configured to select the signal 331 for conveyance to the detector 342. In instances that signal 331 is not greater than the threshold $S_{th}$, the steps may return to step 604. In instances that the signal 331 is greater than the threshold $S_{th}$, the exemplary steps may advance to step 608.

In step 608, it may be determined whether the frequency, $f_{int}$, of the interference signal 104 (FIG. 1) is known. In an exemplary embodiment of the invention, a network administrator may be aware of a nearby radio tower or other source of interference and may program $f_{int}$ into the communication device 102a. In an exemplary embodiment of the invention, the location of the communication device 102a may be utilized to determine nearby sources of interference and the frequencies of the interference. For example, GPS may be utilized to map out the RF characteristics of an area and the GPS coordinates of the communication device 102a may be utilized to determine nearby sources of interference. In instances that $f_{int}$ is not known, the exemplary steps may proceed to step 612

In step 612, the communication device 102a may automatically detect the frequency, $f_{int}$, of the narrowband interference. In this regard, $f_{int}$ may be detected by convergence of the ALE 332 and/or based on levels of the signals 333 and 335 measured by the detector 342. Once $f_{int}$ has been determined, corresponding filters 312 and/or 314 in the differential paths $102_1$-$102_N$ may be configured to pass the detected $f_{int}$ and filter out other frequencies. Subsequent to step 612, the exemplary steps may advance to step 614.

In step 614, the narrowband common mode signal output by the ALE 332 or the filter bank 334 may be delayed by delay block 340, resulting in the enhanced common mode signal 206. The signal 206 may then be phase and/or level adjusted by the adaptive filter 318. Upon the adaptive filter converging or stabilizing, the exemplary steps may proceed to step 616.

In step 616, the multiplexer 325 may be configured to select the signal 319 and the combiner 324 may subtract the signal 319 from the signal 311. Subsequent to step 616, the exemplary steps may proceed to step 618.

In step 618, if the levels of the narrowband signal 337 drops below a threshold then the exemplary steps may proceed to step 604 and interference cancellation may be disabled. This may happen, for example, when the signal 104 goes away or changes frequency. Conversely, while the level of the signal 337 remains above a threshold, interference cancellation may remain enabled.

Returning to step 608, in instances that $f_{int}$ is known, the exemplary steps may proceed to step 610. In step 610, in instances that $f_{int}$ is within a lock range of the ALE 32, then the ALE 332 may be configured such that it will quickly lock to $f_{int}$ and the passband of the corresponding BPFs 312 in the differential paths $202_1$-$202_N$ may be set to $f_{int}$. Alternatively, in instances that $f_{int}$ is outside a lock range of the ALE 332, then the filter bank 334 may be configured to pass $f_{int}$ and the corresponding filter banks 314 in the differential paths $202_1$-$202_N$ may be configured to pass $f_{int}$. Subsequent to step 610, the exemplary steps may advance to step 614.

Various embodiments of a method and system for interference cancellation are provided. In an exemplary embodiment of the invention, one or more circuits and/or processors of a communication device 102a (FIGS. 1-3) may be operable to receive a differential signal 311 (FIG. 3) via a differential channel $106_n$ (FIGS. 1-3), and to sense a common mode signal 327 (FIG. 3) on the differential channel $106_n$. A frequency range in which interference is present in the common mode signal 327 may be determined and the differential signal 311 and the common mode signal 327, or signal 331, an amplified and/or digitized version of signal 327, may be filtered to attenuate frequencies outside the determined frequency range. A phase and/or amplitude of the filtered common mode signal 337, or the signal 206, a delayed version of signal 337, may be adjusted based on the filtered differential signal 317 and the adjusted and filtered common mode signal 319 may be subtracted from the received differential signal 311.

The common mode signal 327 may be sensed via a pair of resistors 408a and 408b (FIG. 4) coupled to the differential channel $106_n$. A first terminal of the resistors 408a may be coupled to a first wire of the differential channel $106_n$, a first terminal of the resistors 408b may be coupled to a second wire of the differential channel $106_n$, a second terminal of the resistor 408a may be coupled to a second terminal of the resistor 408b, and the common mode signal 327 may be present on the second terminals of the resistors. The second terminals of the resistors 408a and 408b may be coupled to a first terminal of a primary winding of a transformer $404_{N+1}$ and a second terminal of the primary winding may be coupled to signal ground.

Either of an adaptive line enhancer 332 and a filter 334 may be selected for performing the filtering. A selection between the adaptive line enhancer 332 and the filter 334 may be based on signal levels output by the adaptive line enhancer 332 and the filter 334. The filter 334 may be selected in instances that the adaptive line enhancer 332 is unable to converge on a frequency within the determined frequency range. A frequency response of the filter 334 may be configured to select between a high-pass response and a low-pass response. The frequency range may be determined based on a programmed value which may be pre-programmed or determined dynamically. The subtraction may be enabled and disabled based on signal levels of the common mode signal 327, or signal 331, an amplified and/or digitized version of signal 327, and/or signal levels of the filtered common mode signal 337. A phase and/or amplitude of the filtered common mode signal 337, or signal 206, a delayed version of signal 337, may be adjusted to minimize a difference between the filtered differential signal 317 and the adjusted and filtered common mode signal 319.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for interference cancellation.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communications, comprising:
sensing a common mode signal;
determining a frequency range in which interference is present in said common mode signal;
adjusting a frequency response of an adaptive filter according to said determined frequency range of said interference in said common mode signal; configuring a responsive filter based on the adjusted frequency response; filtering, with said responsive filter,
a differential signal to generate a filtered differential signal that is without said interference; and
generating a representative signal of the interference in said common mode signal based on the filtered differential signal and an adjusted common mode signal.

2. The method according to claim 1, wherein
determining said frequency range in which interference is present in said common mode signal comprises converging on and locking to a narrowband interference frequency of said common mode signal.

3. The method according to claim 2, further comprising
determining whether to enable or disable an interference cancellation mode based on whether said converging converges on and locks to said narrowband interference frequency of said common mode signal.

4. The method according to claim 1, further comprising
generating the adjusted common mode signal by adjusting at least one of a phase and an amplitude of said common mode signal based on said filtered differential signal.

5. The method according to claim 4, wherein
adjusting at least one of said phase and said amplitude of said common mode signal comprises reducing a difference between said filtered differential signal and said adjusted common mode signal.

6. The method according to claim 4, further comprising
combining said filtered differential signal and said adjusted common mode signal.

7. The method according to claim 1, further comprising
removing interference in the differential signal by subtracting the representative signal from the differential signal.

8. A system for communications, comprising:
a common mode sensor that senses a common mode signal;
a line enhancer that converges on a frequency in which interference is present in said common mode signal; and
circuitry that adjusts a frequency response of the line enhancer according to a frequency range of said interference in said common mode signal, configures a responsive filter based on the adjusted frequency response, filters, with said responsive filter, a differential signal to generate a filtered differential signal that is without said interference, and
generates a representative signal of the interference in said common mode signal based on the filtered differential signal and an adjusted common mode signal.

9. The system according to claim 8, wherein
said line enhancer automatically converges on and locks to a narrowband interference frequency of said common mode signal.

10. The system according to claim 8, wherein the circuitry adjusts, with an adaptive filter, at least one of a phase and an amplitude of said common mode signal based on said filtered differential signal, to provide the adjusted common mode signal.

11. The system according to claim 10, wherein
said circuitry reduces, with said adaptive filter, a difference between said filtered differential signal and said adjusted common mode signal.

12. The system according to claim 10, wherein the circuitry combines said filtered differential signal and said adjusted common mode signal.

13. The system according to claim 8, further comprising:
a filter bank; and
a multiplexer that selects between an output of said line enhancer and an output of said filter bank.

14. The system according to claim 13, wherein
said multiplexer selects said filter bank when said line enhancer is unable to converge on said frequency in which interference is present in said common mode signal.

15. The system according to claim 14, further comprising
a control unit that selects between a high-pass response and a low-pass response of said filter bank.

16. The system according to claim 8, further comprising
a subtractor that removes interference in the differential signal by subtracting the representative signal from the differential signal.

17. A method for communications, comprising:
converging on a frequency in which interference is present in a common mode signal;
determining a frequency range in which interference is present in said common mode signal; adjusting a frequency response of an adaptive filter according to said determined frequency range of said interference in said common mode signal; configuring a responsive filter based on the adjusted frequency response; filtering, with said responsive filter,
a differential signal to generate a filtered differential signal that is without said interference;
enhancing said common mode signal to provide an enhanced common mode signal;
generating a representative signal of the interference in said common mode signal based on the filtered differential signal and the enhanced common mode signal; and
subtracting said representative signal from said differential signal.

18. The method according to claim 17, wherein
converging on said frequency in which interference is present in said common mode signal comprises automatically converging on locking to a narrowband interference frequency of said common mode signal.

19. The method according to claim 17, wherein
enhancing said common mode signal comprises adjusting at least one of a phase and an amplitude of said common mode signal based on said filtered differential signal.

20. The method according to claim 19, wherein
adjusting at least one of said phase and said amplitude of said common mode signal comprises reducing a difference between said filtered differential signal and said enhanced common mode signal.

* * * * *